United States Patent [19]

Peery

[11] Patent Number: 5,260,536
[45] Date of Patent: Nov. 9, 1993

[54] HEAT RETAINING NAPKIN

[76] Inventor: William W. Peery, 6649 Van Gordon Ct., Arvada, Colo. 80004

[21] Appl. No.: 694,434

[22] Filed: May 1, 1991

[51] Int. Cl.$^5$ ............................................. H05B 6/80
[52] U.S. Cl. ...................... 219/10.55 E; 219/10.55 A; 219/10.55 F; 219/10.55 M; 426/107; 426/234; 426/243; 428/516; 428/520
[58] Field of Search .............. 219/10.55 A, 10.55 E, 219/10.55 F, 10.55 M; 426/107, 241, 234, 243, 113; 428/516, 518, 520

[56] References Cited

U.S. PATENT DOCUMENTS

| | | | |
|---|---|---|---|
| 3,830,681 | 8/1974 | Wilson | 219/243 |
| 4,196,331 | 4/1980 | Leveckis et al. | 219/10.55 E |
| 4,594,211 | 6/1986 | Mohnhaupt | 264/141 |
| 4,721,140 | 1/1988 | Coker | 219/10.55 E |
| 4,827,107 | 5/1989 | Peery | 219/521 |
| 4,878,765 | 11/1989 | Watkins et al. | 219/10.55 E |
| 4,933,193 | 6/1990 | Fisher | 426/107 |
| 4,962,000 | 10/1990 | Emslander et al. | 219/10.55 E |

Primary Examiner—Bruce A. Reynolds
Assistant Examiner—Tu Hoang
Attorney, Agent, or Firm—Ralph F. Crandell

[57] ABSTRACT

A thermal napkin cozy for wrapping heated bread or food products for serving at a dining table. The cozy is formed of inner and outer fabric layers and an intermediate thermal insulating material comprising a heat reflecting, microwave transparent polyolefin layer, a polyester foam layer bonded to the heat reflecting layer and a polypropylene backing layer bonded to the foam. The inner and outer layers may be bonded to the thermal layer. Surface contact fasteners are provided on the napkin cozy on opposite corners for securing the cozy around the wrapped item. Food products, entrees, dinners, breads, biscuits, rolls, and the like may be wrapped in the napkin and heated in a microwave oven before serving.

8 Claims, 3 Drawing Sheets

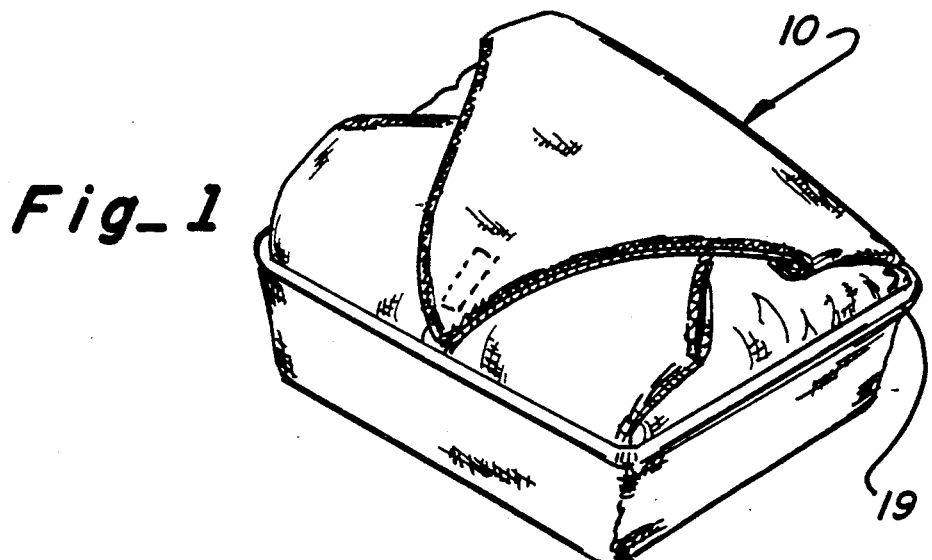
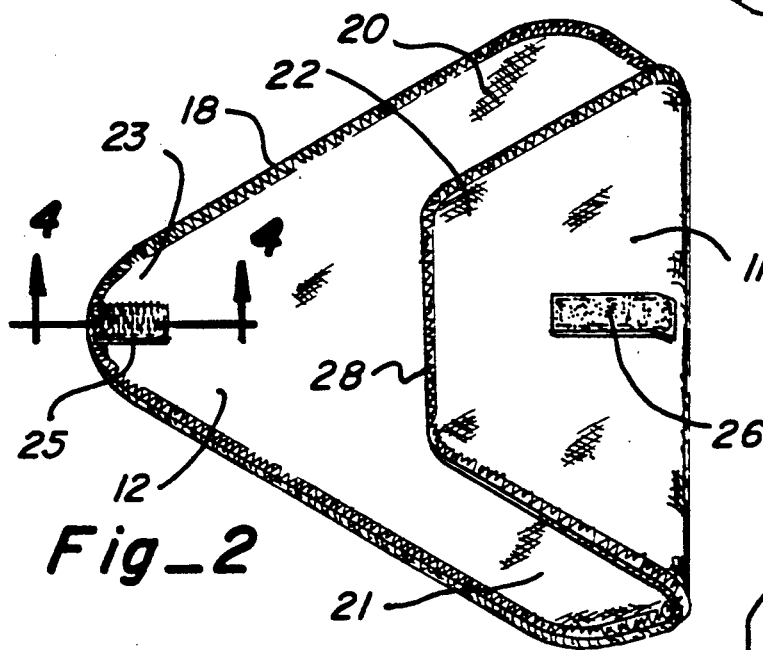
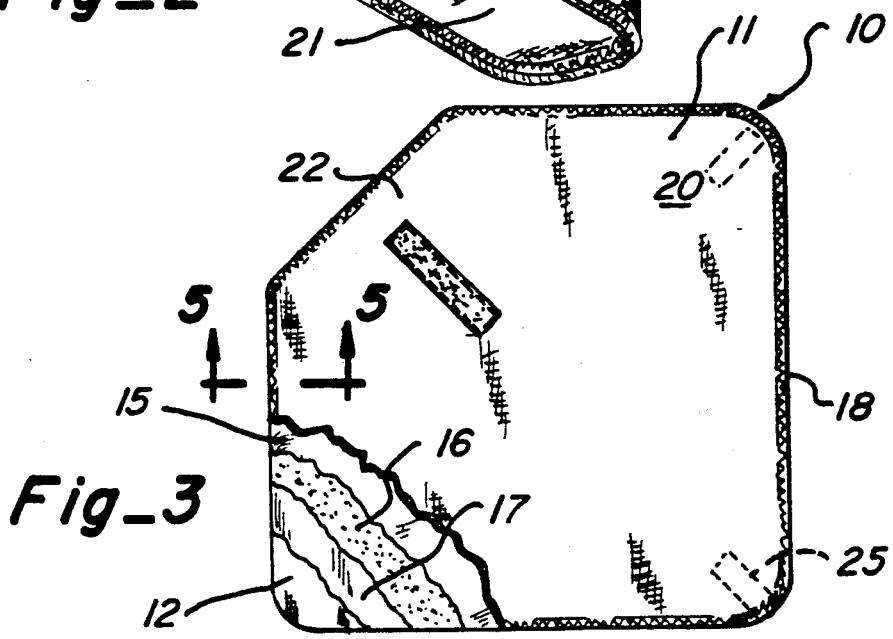

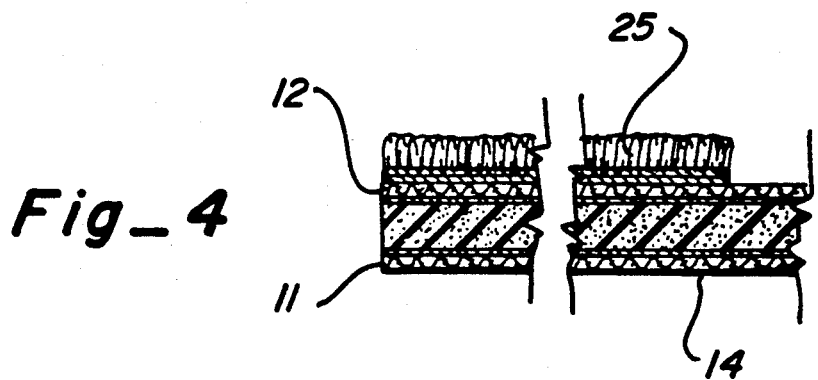
Fig_4
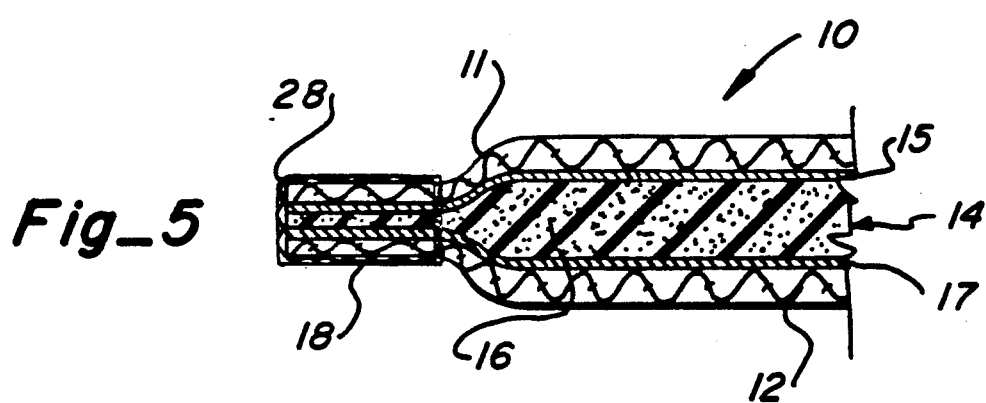
Fig_5
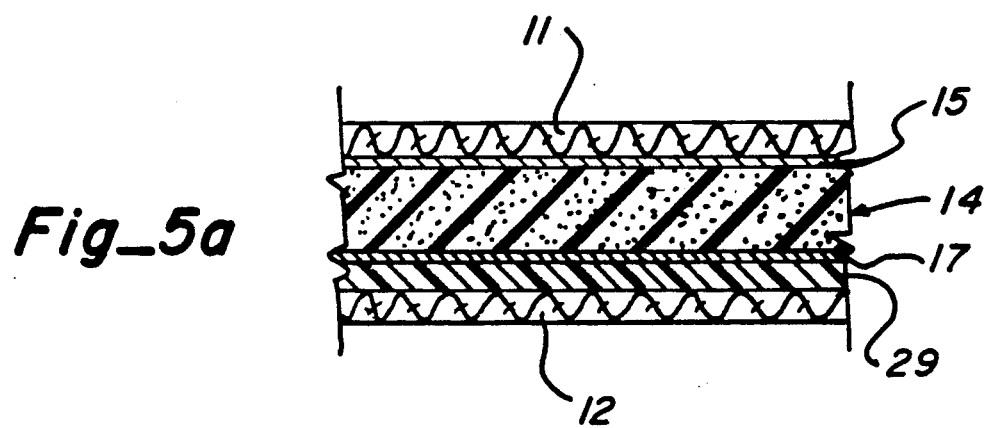
Fig_5a

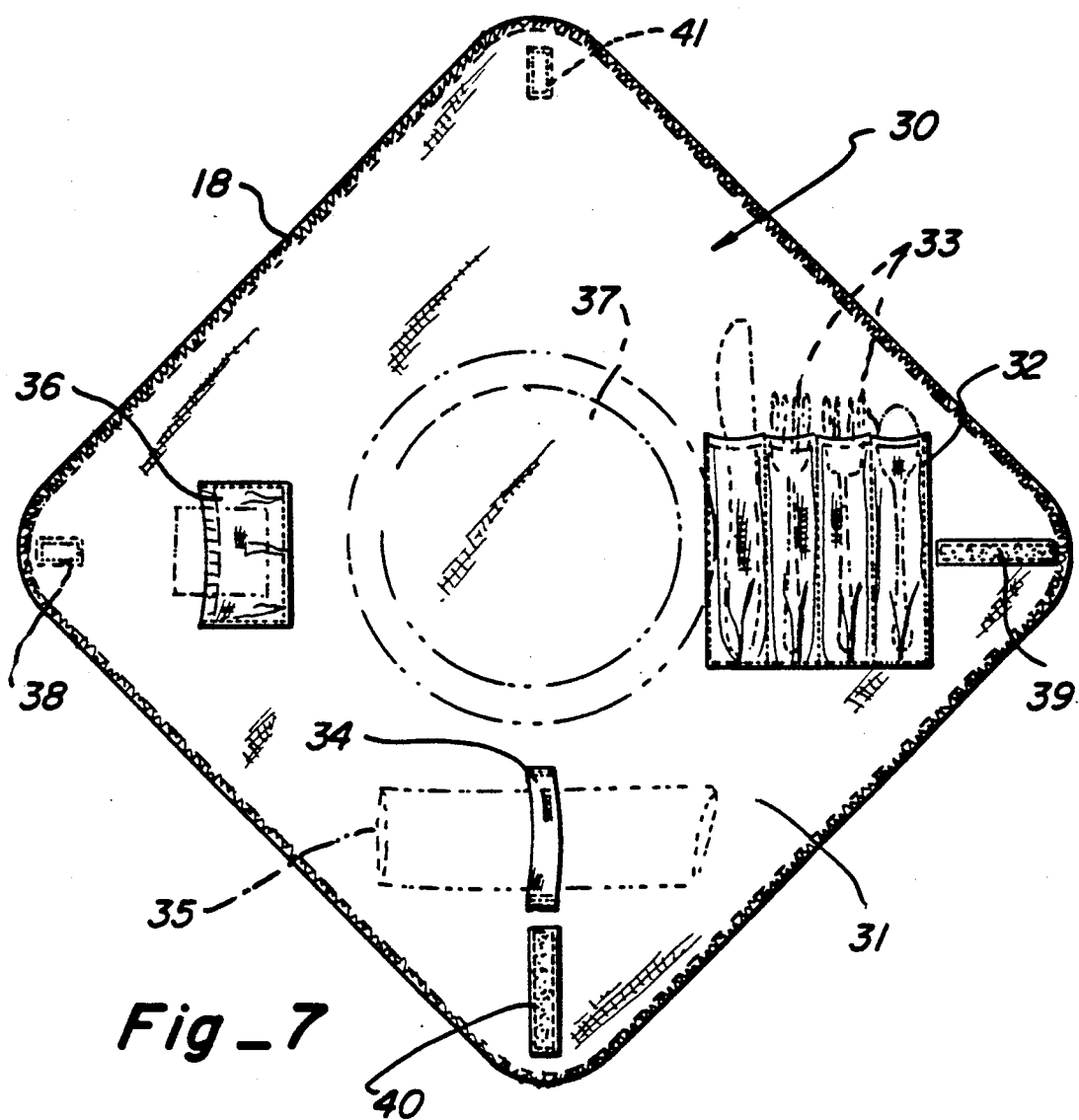
Fig_7
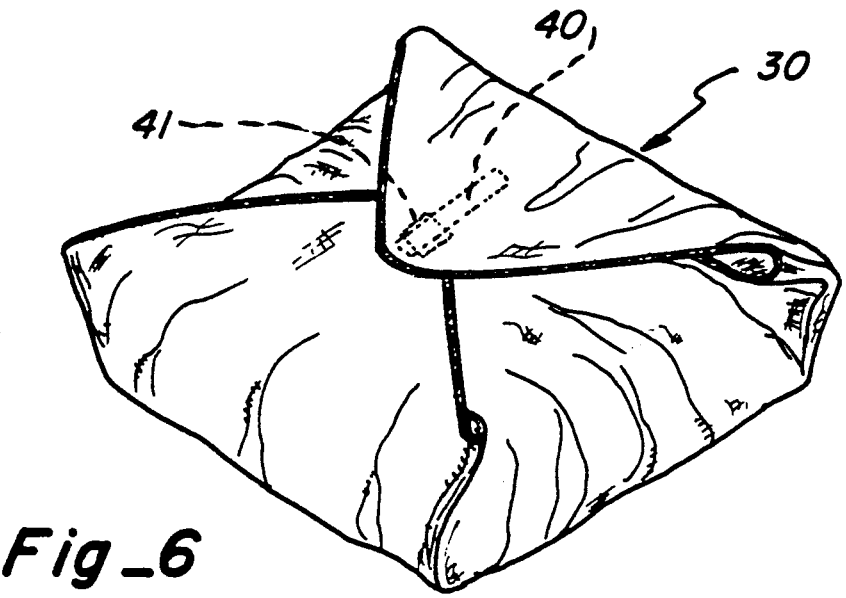
Fig_6

HEAT RETAINING NAPKIN

BACKGROUND OF THE INVENTION

1. Field of the Invention

The present invention relates to a napkin or cozy for use in serving foods such as hot breads. More particularly, the invention relates to napkins which are thermally insulating to retard heat and moisture loss from foods wrapped therein.

2. Description of the Prior Art

The use of cloth or paper napkins is an ancient and well known practice for wrapping breads and other foods to be served at a dining table. To this end, such foods as breads, rolls, muffins and the like, are conventionally wrapped in an ordinary cloth or paper napkin and contained in a basket or similar container or on a plate for serving at a dining table. The use of thermally insulated and heated containers such as covered dishes and baskets for serving bread, bakery products and the like is well known as shown in applicant's U.S. Pat. No. 4,827,107, issued May 2, 1989, for BATTERY-POWERED FOOD WARMER.

Electrically heated baskets, trays, and containers are old and well known in the art. The use of thermally insulated wrappers is also an old and well known practice. Such napkins have been less than efficient or have involved other problems such as lack of durability or washability, or have been heavy or bulky or expensive.

Common table napkins have been used to wrap food products, but are simply flipped over the product, do not retain moisture or maintain the desired temperature for more than a few minutes. Such napkins are designed and formed of a fabric intended to absorb moisture, not retain the mositure content of the food.

OBJECTS AND SUMMARY OF THE INVENTION

It is the principal object of the present invention to provide an improved thermal napkin, finding particular adaptation as a cozy for wrapping breads and bakery items to preserve the temperature and moisture characteristics thereof prior to and during service at a dining table.

Another object of the present invention is to provide an improved napkin or cozy for wrapping bread and bakery products for service at a dining table while allowing ready access to the edible product.

A further object of the present invention is to provide a bread napkin or cozy with an improved construction and configuration facilitating its use and enhancing its effectiveness in maintaining the integrity of the wrapped bakery product.

Still a further object of the present invention is to provide a bread napkin or cozy which can be neatly folded around the product and is adjustable to accommodate a variety of sizes of servings while tightly covering the product to protect and preserve it in optimum edible condition.

Still a further object of the present invention is to provide a bread cozy or napkin of the foregoing character which is readily washable, wipeable, or both, to provide a sanitary food wrapping.

Still a further object of the present invention is to provide a bread napkin or cozy of the foregoing character which is durable, attractive and suitable for various ornamental surface designs.

Another object of the present invention is to provide a napkin or cozy of the foregoing character which is suitable for wrapping a covered dinner plate or pan containing an entree or a complete meal, to preserve the optimum temperature of the food and cover and protect the item.

A further related object of the present invention is to provide a napkin or cozy adapted for wrapping a meal or entree and further adapted to include silverware, napkins, and condiments in a handy but protected setting.

Still a further object is to provide a unique food wrapper and service assembly of the foregoing character which insulates the food product during transportation from a kitchen to a serving point, and provides a more compact unit for transportation on a delivery cart or tray to a serving point.

Other objects and advantages of the present invention will become apparent as the following description proceeds.

In accordance with the foregoing objects, the present invention contemplates a napkin type bread cozy for wrapping bread and bakery products for serving at a dining table. The cozy comprises a thermal laminated fabric construction having inner and outer fabric layers and an intermediate thermal insulating layer. The intermediate layer is preferably formed of a heat reflecting polyolefin film, a polyester foam film bonded to the heat reflecting film, and a polypropylene backing film bonded to the foam. The thermal insulating layer may be bonded to the inner and outer fabric layers, and the napkin or cozy cut into the desired shape and hemmed at its peripheral edges. A surface contact fastener is secured to the inner fabric layer adjacent a first corner portion and a mating surface contact fastener is secured to the outer fabric layer adjacent and opposite second corner portion. The second corner portion may be truncated to eliminate excessive fabric when the napkin is folded around a contained bread product and secured therearound by contact between the surface contact fasteners. Surface contact fasteners may also be secured to the remaining corners for further securing the napkin corners together. The cozy provides a secure attractive wrapping for serving bread and bakery products and retains the moisture and freshness of the wrapped products for a sufficient period to allow diners to enjoy the bakery products.

DESCRIPTION OF THE DRAWINGS

FIG. 1 is a perspective view of a thermal napkin or bread cozy embodying the present invention wrapping bread products and contained within a serving basket.

FIG. 2 is a plan view of the napkin shown in FIG. 1 with one corner folded back on itself.

FIG. 3 is an unfolded plan view of the napkin shown in FIG. 2 with portions cut-away for clarity in illustration.

FIG. 4 is an enlarged section view taken substantially in the plane of level 4—4 on FIG. 2.

FIG. 5 is an enlarged section view taken substantially in the plane of line 5—5 on FIG. 3, FIG. 5a is an enlarged section view similar to FIG. 5 but showing an additional water impervious layer.

FIG. 6 is an elevation view of a napkin or cozy wrapping a covered dinner plate.

FIG. 7 is a plan view of the napkin or cozy shown in FIG. 6 opened to provide a table cloth for a dinner plate and including holders for silverware, napkins, condiments, and the like.

DESCRIPTION OF THE PREFERRED EMBODIMENT

The present invention is embodied in a napkin type bread cozy for wrapping bread products for serving at a dining table in order to preserve the integrity, temperature, and freshness of the bread. To this end, the napkin cozy 10 is formed of materials which provide a soft, flexible, lightweight thermal heat and moisture transmission resistant napkin capable of being placed in a bread basket and when the bread or bakery product is placed thereon, wrapped around the product and closed by an appropriate fastener to contain the bread and thereby preserve the temperature and freshness of the bread. As the bread product is consumed, the napkin wrapper or cozy can be opened so that a portion of the bread can be removed for eating and the remaining bread then covered and rewrapped by folding the napkin or cozy snugly over the remaining bakery product.

The napkin 10 is formed by inner and outer fabric layers such as cotton, polyester, nylon, blends, or similar cloth napkins 11, 12, and an intermediate thermal multi-layer insulating material 14. The insulating material is a thin, flexible, lightweight multi-layer material having a heat reflecting, microwave transparent, polyolefin layer 15 bonded to a polyester foam layer 16 in turn bonded to a polypropylene backing layer 17. If desired, the fabric inner and outer layers 11, 12 may be bonded respectively to the heat reflecting polyolefin layer and polypropylene backing layer by a surface contact adhesive or a thermal adhesive or the like, or by quilting, to provide a unitary, laminated napkin cozy structure. The napkin cozy is cut to the desired shape such as rectangular, oval or circular, and may have a hem 18 at its outer peripheral edges to hold the layers thereof together and prevent ravelling. The hem 18 may be sewed or adhesively bonded to the laminated fabrics.

The heat reflecting polyolefin layer 15 is preferably located at a remote position as possible from the contained product; that is, the heat reflecting polyolefin layer 15 is positioned adjacent the outer fabric layer 11 of the napkin cozy 10 and faces the outside surface of the napkin cozy. Likewise, the polypropylene backing 17 is placed adjacent the inner fabric layer 12, that is the fabric layer which is immediately adjacent the bakery product when the latter is wrapped in the cozy.

In use, the napkin cozy is preferably placed in a container such as a basket 19, although it may be used separately from a basket. The bakery product to be wrapped is placed centrally on the cozy on the inner fabric layer 12 and opposite quarter portions or corners 20, 21 are folded over the top of the bakery product. A second quarter portion or corner 22 is folded over the top of the folded side portions and a first corner or quarter portion 23 is then folded over the top to complete the envelope. In order to hold the corners together and hold the cozy over the product during serving, it is desirable to utilize surface contact fasteners to hold at least the outer two corner portions together. For this purpose, a surface contact fastener 25 is secured to the inner fabric layer adjacent the first corner portion 23 while a mating surface contact fastener 26 is secured to the outer fabric layer adjacent the second corner or quarter portion 24 opposite from said first corner or quarter portion 23. In the folded configuration, the surface contact fasteners abut each other and may be placed together to retain the folded corners and produce a cozy or envelope surrounding the bakery product. After being placed on a dining table, the diners may open the cozy, remove a portion of the bakery product and then fold the corners together and secure the surface contact fasteners to preserve and protect the temperature and freshness of the enclosed bakery product. Additional surface contact fasteners may be placed at the intermediate corners or quarter portions 20, 21 to further secure the cozy.

In order to eliminate some bulkiness of the cozy, the second corner or quarter portion 22 may be truncated 28 to eliminate excess fabric. This simplifies and enhances the folding of the napkin cozy around the contained bread product. If the corners or quarter portions are sufficiently rounded further truncation may not be necessary. In other words, a circular or oval napkin cozy could be utilized to advantage.

The inner and outer fabric layers may be of any suitable washable or permanent press fabric products such as cotton or a blend of cotton and synthetic materials such as polyesters. The fabric may be relatively thin and of light weight in view of the fact that the entire napkin cozy is a laminated product. Alternatively, the exposed surface of one or both of the lower and upper fabric layers 11, 12 may be of an impervious vinyl type material providing a wipeable surface. The various layers thus provide intermediate insulating air spaces which enhance the napkin's heat retaining characteristics.

In order to protect the thermal layer 14 from damage by moisture when the napkin cozy is used for microwave heating of products with a high moisture content, a further intermediate water impervious layer 29, formed of vinyl or other water impervious material, may be inserted intermediate the thermal material 14 and the bottom or inner napkin fabric 12, as shown in FIG. 5a. The bottom fabric layer 12 may also include on its inner surface a vinyl coating to provide a moisture impervious barrier. This coating may be used with or as an alternative to the water impervious layer 29.

The napkin cozy described above is superior in its heat retention characteristics. Table I sets forth the average temperatures after many tests to determine the advantage of the thermal napkin cozy over the conventional napkin method of wrapping rolls for a dining table.

TABLE I

| Rolls started at 170° and Room Temperature at 70° | | | | | | |
|---|---|---|---|---|---|---|
| | 5 MIN. | 10 MIN. | 15 MIN. | 20 MIN. | 25 MIN. | 30 MIN. |
| Customary Wrap | 136° | 119° | 107° | 98° | 88° | 83° |
| Thermal Wrap | 152° | 141° | 132° | 125° | 114° | 113° |

Referring to Table I, the rolls were initially measured at a temperature of 170° F. and were then wrapped in both the thermal napkin cozy embodying the present invention and in a conventional napkin. The rolls were started at a temperature of 170° F. and readings were taken every five minutes thereafter. From Table I, it can be seen that the conventionally wrapped rolls dropped drastically in temperature from 170° F. to 136° F. within the first five minutes. In the same period, the napkin cozy embodying the present invention allowed a drop of only 18°. After 30 minutes, the rolls wrapped in the conventional napkin had a temperature of 83° F. while the rolls wrapped in the napkin cozy embodying the present invention had a temperature 30° higher or 113° F. Room temperature was constant at 70° F.

The thermal napkin cozy embodying the present invention retains the moisture within the food and thus, the bread or rolls heated and then wrapped do not dry out and maintain their desirable freshness characteristics. In contrast, the pores of a conventional napkin allow the moisture to escape and consequently the food product not only cools as a result of moisture evaporation, but tends to become dry and hard.

The surface contact fastener utilized in connection with the present invention, such as a hook and loop pile fastener, insures a more efficient heat retaining system than does simply folding the corners of the napkin over the bread. The surface contact fastener assures a tighter cozy, producing less vacant air space and preventing heat from escaping through the loose corners of the napkin. Also, the surface contact fasteners provide for a smaller or larger amount of bread product, thereby accommodating various numbers of diners.

Food, such as table breads, can be wrapped in the napkin cozy and then heated in a microwave oven for a time sufficient to warm the particular product, thereby providing a fast, efficient heating method prior to placing the product on the table. During heating, the moisture is retained with the cozy, thereby preserving the desirable characteristics of the product. The foods may be prepared and wrapped in advance of and in preparation for serving. When needed, the entire basket or container, wrapper or cozy, and food may be placed in a microwave oven to quickly warm the food which is then immediately served.

A silk screen, decal, or cloth label logo or design can be placed on the outside corner or corners of the napkin cozy reflecting the establishment in which the product is being served. Monograms or initials can be provided for personalization.

An alternative use for the napkin cozy is in the transportation of food dishes from a kitchen remote from the dining table. For example, hot dishes, such as entrees or complete plate meals may be wrapped in the napkin cozy and delivered to a hotel or hospital room, hot and ready to eat. Where appropriate, the food may be warmed in a microwave oven before serving.

An appropriate napkin cozy for the transportation and serving of food dishes is shown in FIGS. 6 and 7. The napkin cozy 30 for food service is constructed in the same manner as the napkin cozy 10 shown in FIG. 1 and includes the inner and outer fabric layers with the intermediate layers of heat reflecting polyolefin, foam, and polypropylene backing. The napkin cozy, when laid out flat on a table, as shown in FIG. 7, is large enough so that the inner fabric or cloth layer 31 serves as a table cloth. The table cloth may be appropriately designed or monogrammed to taste. The napkin cozy further includes appropriate pocket structures 32 to contain silverware, including metal or plastic knives, forks, and spoons 33, a strap 34, which may be an elastic band, containing a napkin 35 and appropriate pockets 36 for condiments. A plate covered by a metal or plastic cover 37 may be placed in the center of the napkin cozy and, after inserting the silverware, napkin, and condiments, the cover may be folded over the covered plate to keep the plate and its contents warm during transportation and serving. A wrapped plate and napkin cozy is shown in FIG. 6. The opposite lateral corners of the cozy may be secured together by an appropriate surface contact fastener and the remaining corners wrapped over the plate and likewise secured by appropriate surface contact fasteners 44, 41. For further warming, the entire wrapped plate, plastic cover and food may be heated in a microwave oven. The napkin will keep the food warm until served. The cover, utensils and condiments must be suitable for exposure to microwave energy.

The napkin cozy may also be used as a cover or blanket placed over the food or other item in which heat is to be retained. Further, the material may be shaped or sewn into a specific form such as a cover or cozy for a tea or coffee pot.

While illustrative embodiments of the present invention has been shown in the drawings and described above in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. A napkin cozy for wrapping bread products for serving, comprising a first fabric layer having inner and outer surfaces and a second fabric layer having inner and outer surfaces, an intermediate thermal insulating material layer positioned between said first and second fabric layers and comprising a heat reflecting, microwave transparent polyolefin layer, a polyester foam layer bonded to said heat reflecting, microwave transparent polyolefin layer and a polypropylene backing layer bonded to said polyester foam layer, means hemming said fabric layers and thermal insulating material layer together at their peripheral edges, a surface contact fastener secured to said outer surface of said first fabric layer at a first corner portion of said napkin, a mating surface contact fastener secured to said outer surface of said second fabric layer at a second corner portion opposite to said first corner portion of said napkin, said second corner portion being truncated to eliminate excess fabric when said napkin is folded around a contained item with said remaining corner portions folded beneath said first and second corner portions to provide a heat and moisture retaining envelope containing and preserving the taste and texture integrity of said bread products.

2. A napkin cozy as defined in claim 1, wherein said napkin is generally rectangular in configuration.

3. A napkin cozy as defined in claim 1 wherein said napkin includes a moisture impervious layer intermediated said polypropylene backing layer and said first fabric layer.

4. A napkin cozy as defined in claim 3 wherein said moisture impervious layer comprises a moisture impervious coating on said inner surface of said first layer adjacent said polypropylene backing layer.

5. A napkin cozy as defined in claim 1 wherein said first fabric layer has a wipeable external surface.

6. A napkin cozy for wrapping items for serving comprising first fabric layer having inner and outer surfaces and a second fabric layer having inner and outer surfaces, an intermediate thermal insulating material layer positioned between said first and second fabric layers and comprising a heat reflecting, microwave transparent polyolefin layer, a polyester foam layer bonded to said heat reflecting, microwave transparent polyolefin layer and a polypropylene backing layer bonded to said polyester foam layer, means hemming said fabric layers and thermal insulating material layer together at their peripheral edges, a surface contact fastener secured to said outer surface of said first fabric layer at a first corner portion of said napkin, a mating surface contact fastener secured to said outer surface of said second fabric layer at a second corner portion opposite to said first corner portion of said napkin, said second corner portion being truncated to eliminate excess fabric when said napkin is folded around a contained item with said remaining corner portions folded beneath said first and second corner portions to provide a heat and moisture retaining envelope, and means on said outer surface of said first fabric layer defining pockets for receiving and retaining silverware, a napkin and condiments.

7. A napkin cozy as defined in claim 6 wherein said napkin includes a moisture impervious layer intermediated said polypropylene backing layer and said first fabric layer.

8. A napkin cozy as defined in claim 6 wherein said first fabric layer has a wipeable external surface.

* * * * *